US010876481B2

(12) United States Patent
Yoshida et al.

(10) Patent No.: US 10,876,481 B2
(45) Date of Patent: Dec. 29, 2020

(54) SEAL SEGMENT AND ROTARY MACHINE

(71) Applicants: Mitsubishi Hitachi Power Systems, Ltd., Kanagawa (JP); Eagle Industry Co., Ltd., Tokyo (JP)

(72) Inventors: Azumi Yoshida, Tokyo (JP); Hidekazu Uehara, Tokyo (JP); Shin Nishimoto, Yokohama (JP); Naoya Tatsumi, Yokohama (JP); Kohei Ozaki, Tokyo (JP); Toru Kono, Tokyo (JP); Ryu Kikuchi, Tokyo (JP)

(73) Assignees: MITSUBISHI HITACHI POWER SYSTEMS, LTD., Kanagawa (JP); EAGLE INDUSTRY CO., LTD., Tokyo (JP)

( * ) Notice: Subject to any disclaimer, the term of this patent is extended or adjusted under 35 U.S.C. 154(b) by 116 days.

(21) Appl. No.: 16/096,885

(22) PCT Filed: May 2, 2017

(86) PCT No.: PCT/JP2017/017245
§ 371 (c)(1),
(2) Date: Oct. 26, 2018

(87) PCT Pub. No.: WO2017/195704
PCT Pub. Date: Nov. 16, 2017

(65) Prior Publication Data
US 2019/0136766 A1 May 9, 2019

(30) Foreign Application Priority Data

May 9, 2016 (JP) ................................ 2016-093905

(51) Int. Cl.
*F16J 15/3292* (2016.01)
*F02C 7/28* (2006.01)
(Continued)

(52) U.S. Cl.
CPC ................ *F02C 7/28* (2013.01); *F01D 11/02* (2013.01); *F04D 29/10* (2013.01); *F04D 29/106* (2013.01); *F16J 15/3292* (2013.01)

(58) Field of Classification Search
CPC .......... F02C 7/28; F01D 11/02; F01D 11/025; F01D 11/00; F04D 29/10; F04D 29/106;
(Continued)

(56) References Cited

U.S. PATENT DOCUMENTS 6,343,792 B1 * 2/2002 Shinohara ............. F01D 11/001
277/345
8,100,406 B2 * 1/2012 Wright .................... F01D 11/00
277/355

(Continued)

FOREIGN PATENT DOCUMENTS

CN 102362107 2/2012
CN 102362109 2/2012
(Continued)

OTHER PUBLICATIONS

International Search Report dated Jul. 18, 2017 in corresponding International (PCT) Application No. PCT/JP2017/017245 with English translation.
(Continued)

*Primary Examiner* — Nathan Cumar
(74) *Attorney, Agent, or Firm* — Wenderoth, Lind & Ponack, L.L.P.

(57) ABSTRACT

A seal segment includes a retainer extending in a circumferential direction of a rotary shaft on an outer circumferential side of the rotary shaft; a first seal body which has a plurality of first thin plate seal pieces extending inward in a radial direction from the retainer and laminated in the circumferential direction; a high-pressure side plate; a low-pressure side plate; and a second seal body having a plurality
(Continued)

of second thin plate seal pieces which are laminated at an end portion of the retainer in the circumferential direction, extend inward in the radial direction, and have fluttering resistance higher than the first thin plate seal piece. The high-pressure side plate and the low-pressure side plate cover at least a part of the second seal body in the circumferential direction.

10 Claims, 9 Drawing Sheets

(51) Int. Cl.
  *F01D 11/02* (2006.01)
  *F04D 29/10* (2006.01)
(58) Field of Classification Search
  CPC ... F16J 15/3292; F16J 15/3296; F16J 15/3268
  USPC .......................................................... 277/355
  See application file for complete search history.

(56) References Cited

U.S. PATENT DOCUMENTS

| 2008/0309018 A1* | 12/2008 | Williams | ............. | F01D 11/003 |
| | | | | 277/411 |
| 2009/0315272 A1* | 12/2009 | Kasahara | ............. | F01D 11/003 |
| | | | | 277/355 |
| 2011/0309585 A1* | 12/2011 | Uehara | ................... | F01D 11/02 |
| | | | | 277/352 |
| 2011/0316237 A1* | 12/2011 | Uehara | ................. | F01D 11/001 |
| | | | | 277/413 |
| 2012/0261884 A1* | 10/2012 | Uehara | ................. | F01D 11/001 |
| | | | | 277/411 |
| 2014/0241877 A1* | 8/2014 | Uehara | ................. | F01D 11/001 |
| | | | | 415/231 |
| 2015/0345640 A1* | 12/2015 | Inoue | ................... | F01D 11/001 |
| | | | | 277/355 |

FOREIGN PATENT DOCUMENTS

| CN | 102667067 | 9/2012 |
| EP | 2 444 699 | 4/2012 |
| EP | 2 669 555 | 12/2013 |
| JP | 3692300 | 9/2005 |
| JP | 2005-308039 | 11/2005 |
| JP | 2008-261498 | 10/2008 |
| WO | 2008/004590 | 1/2008 |
| WO | 2010/146805 | 12/2010 |

OTHER PUBLICATIONS

Written Opinion of the International Searching Authority dated Jul. 18, 2017 in corresponding International (PCT) Application No. PCT/JP2017/017245 with English translation.

* cited by examiner

SEAL SEGMENT AND ROTARY MACHINE

TECHNICAL FIELD

The present invention relates to a seal segment and a rotary machine.

Priority is claimed on Japanese Patent Application No. 2016-093905, filed on May 9, 2016, the content of which is incorporated herein by reference.

BACKGROUND ART

Around a rotor in a rotary machine such as a gas turbine and a steam turbine, a shaft seal device is provided to reduce a leakage amount of a working fluid flowing from a high-pressure side to a low-pressure side. As an example of this shaft seal device, for example, a shaft seal device described in the following Patent Document 1 is known.

The shaft seal device includes a housing provided in a stator, and a seal body made up of a plurality of thin plate seal pieces, and a high-pressure side plate and a low-pressure side plate which are divided into a plurality of plates in a circumferential direction of the rotor and provided to extend along the high-pressure side and the low-pressure side of the seal body. Further, the low-pressure side plate and the high-pressure side plate restrict the flow of the working fluid to small gaps of the thin plate seal pieces, thereby producing a flow in which the thin plate seal pieces easily float.

CITATION LIST

Patent Literature

[Patent Document 1]
Japanese Unexamined Patent Application, First Publication No. 2005-308039

SUMMARY OF INVENTION

Technical Problem

However, since it is difficult to restrict the flow of the thin plate seal pieces to the small gaps in the divided portions of the high-pressure side plate and the low-pressure side plate, the floating performance of the thin plate seal pieces may be lowered, or fluttering may occur in the thin plate seal pieces.

The present invention provides a seal segment and a rotary machine capable of suppressing performance deterioration of floating characteristics of the thin plate seals piece, and fluttering generated in the thin plate seal pieces.

Solution to Problem

A seal segment according to a first aspect of the present invention includes a retainer extending in a circumferential direction of a rotary shaft on an outer circumferential side of the rotary shaft; a first seal body which has a plurality of first thin plate seal pieces extending inward in a radial direction from the retainer and laminated in the circumferential direction; a high-pressure side plate which is supported to be sandwiched between the first seal body and the retainer, and covers a high-pressure side in an axial direction of the first seal body over the circumferential direction; a low-pressure side plate which is supported to be sandwiched between the first seal body and the retainer, and covers a low-pressure side in the axial direction of the first seal body over the circumferential direction; and a second seal body having a plurality of second thin plate seal pieces which are laminated at an end portion of the retainer in the circumferential direction, extend inward in the radial direction, and have higher fluttering resistance than the first thin plate seal pieces, wherein the high-pressure side plate and the low-pressure side plate cover at least a part of the second seal body in the circumferential direction.

In this aspect, since the fluttering resistance of the thin plate seal pieces is enhanced while maintaining a flow in which the thin plate seal pieces are likely to float at portions at which fluttering is likely to occur, it is possible to suppress performance deterioration of the floating characteristics of the thin plate seal pieces or fluttering generated in the thin plate seal pieces.

The seal segment of a second aspect is the seal segment of the first aspect in which the second thin plate seal pieces have greater rigidity than the first thin plate seal pieces.

In the aspect, fluttering resistance can be enhanced by selecting and combining the structure or material of the second thin plate seal pieces.

The seal segment of the third aspect is the seal segment of the first or second aspect in which the second thin plate seal pieces have a thicker plate thickness than the first thin plate seal pieces.

In this aspect, fluttering resistance can be enhanced by adjusting the plate thickness of the second thin plate seal piece.

The seal segment of a fourth aspect is the seal segment of one of the first to third aspects in which the number of the second thin plate seal pieces is plural, and the plate thickness decreases toward the first thin plate seal pieces.

In this aspect, it is possible to impart floating characteristics to the second thin plate seal pieces.

The seal segment of the fifth aspect is the seal segment of any one of the first to fourth aspects in which the second thin plate seal pieces have a smaller length extending inward in the radial direction than the first thin plate seal pieces.

In this aspect, fluttering resistance can be enhanced by adjusting the extending length of the second thin plate seal pieces.

The seal segment of a sixth aspect is the seal segment of one of the first to fifth aspects in which the number of the second thin plate seal pieces is plural, and the length extending inward in the radial direction increases toward the first thin plate seal pieces.

In this aspect, it is possible to impart floating characteristics to the second thin plate seal pieces.

A rotary machine according to a seventh aspect is a rotary machine including the seal segment according to any of the first to sixth aspects.

In this aspect, it is possible to suppress performance deterioration of floating characteristics of the plate seal piece of the rotary machine or fluttering generated in the thin plate seal piece.

Advantageous Effects of Invention

The seal segment of the present invention can suppress performance deterioration of floating characteristics of the thin plate seal pieces and fluttering generated in the thin plate seal pieces.

DESCRIPTION OF EMBODIMENTS

Hereinafter, various embodiments of the present invention will be described with reference to the drawings.

First Embodiment

Hereinafter, the first embodiment of the present invention will be described in detail. In the present embodiment, an example in which a shaft seal device 10 is applied to a gas turbine (rotary machine) 1 is shown.

Figure 1:
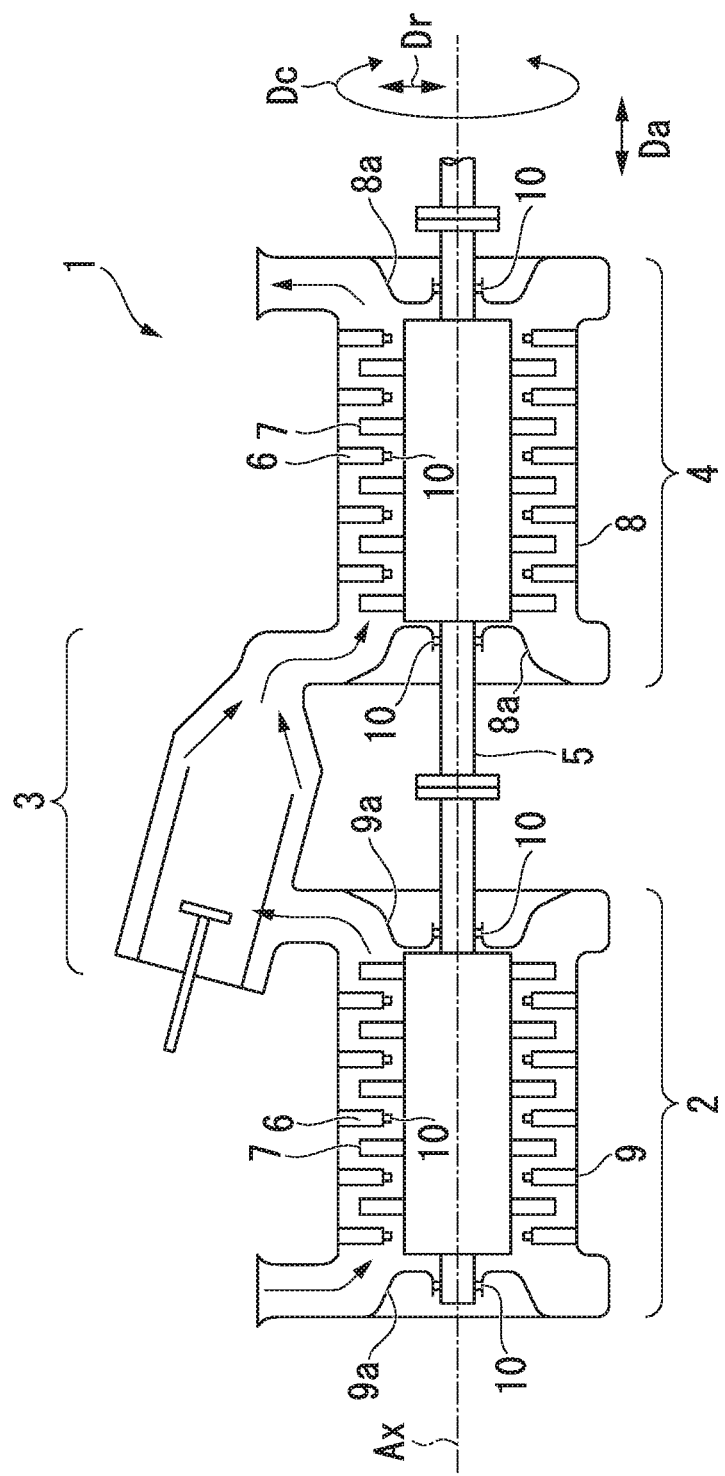
FIG. 1 is a schematic overall configuration diagram of a gas turbine (rotary machine) according to a first embodiment of the present invention.

The gas turbine 1 shown in FIG. 1 has a compressor 2 that takes a large amount of air inside and compresses the air, and a combustor 3 that mixes fuel with the air compressed by the compressor 2 and combusts the mixture. The gas turbine 1 further has a rotating turbine 4, and a rotor 5 (rotary shaft) that transmits a part of the rotating power of the turbine 4 to the compressor 2 to rotate the compressor 2.

The combustion gas generated in the combustor 3 is introduced into the turbine 4, and thermal energy of the combustion gas is converted into rotational energy to rotate the turbine 4.

In the following description, a direction in which an axis Ax of the rotor 5 extends is defined as an "axial direction Da," a circumferential direction of the rotor 5 is defined as a "circumferential direction Dc," a radial direction of the rotor 5 is defined as a "radial direction Dr," and a rotational direction of the rotor 5 is defined as a "rotational direction Bc."

In the gas turbine 1 having the above-described configuration, the turbine 4 converts thermal energy of the combustion gas into mechanical rotational energy to generate power by blowing the combustion gas to the turbine blades 7 provided on the rotor 5. In addition to the plurality of turbine blades 7 on the rotor 5 side of the turbine 4, a plurality of turbine vanes 6 are provided on a casing 8 side of the turbine 4, and the turbine blades 7 and the turbine vanes 6 are alternately arranged in the axial direction Da.

The turbine blades 7 receive the pressure of the combustion gas flowing in the axial direction Da to rotate the rotor 5 around the axis, and the rotational energy applied to the rotor 5 is used by being taken out from a shaft end. Between the turbine vanes 6 and the rotor 5, a shaft seal device 10 is provided as a shaft seal for reducing the leakage amount of combustion gas leaking from the high-pressure side to the low-pressure side.

The compressor 2 is coaxially connected to the turbine 4 by the rotor 5, compresses the outside air using the rotation of the turbine 4, and supplies the compressed air to the combustor 3. Like the turbine 4, in the compressor 2, a plurality of turbine blades 7 are provided on the rotor 5 and a plurality of turbine vanes 6 are provided on the casing 9 side of the compressor 2, and the turbine blades 7 and the turbine vanes 6 are alternately arranged in the axial direction Da. Furthermore, the shaft seal device 10 for reducing the leakage amount of compressed air leaking from the high-pressure side to the low-pressure side is also provided between the turbine vanes 6 and the rotor 5.

In addition, the shaft seal device 10 for preventing the compressed air or the combustion gas from leaking from the high-pressure side to the low-pressure side is also provided in a bearing portion 9a by which the casing 9 of the compressor 2 supports the rotor 5, and a bearing portion 8a by which the casing 8 of the turbine 4 supports the rotor 5.

Here, the shaft seal device 10 according to the present embodiment is not limited to application to the gas turbine 1. For example, the shaft seal device 10 can be widely adopted in general rotary machines that convert energy into work by rotation of a shaft and flow of a fluid, such as a large-scale fluid machine such as a steam turbine, a compressor, a water wheel, a refrigerator or a pump. In this case, the shaft seal device 10 can also be widely used to suppress the flow of a fluid in the axial direction Da.

Figure 2:
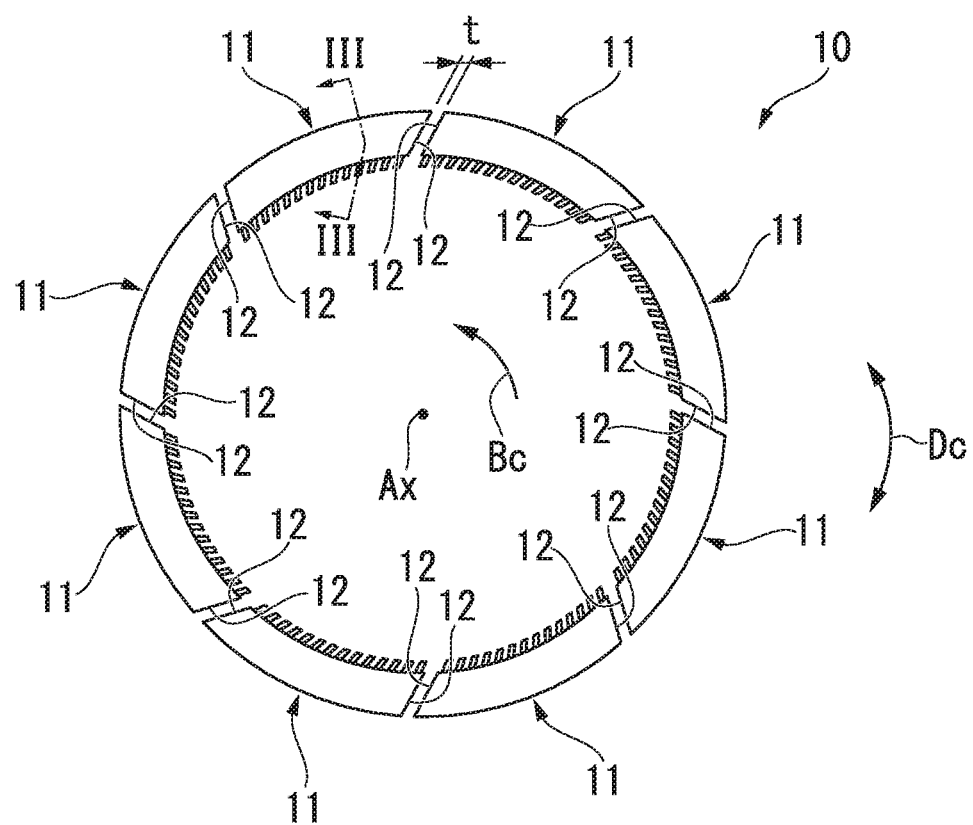
FIG. 2 is a schematic configuration diagram of a shaft seal device according to the first embodiment of the present invention.

Next, the configuration of the shaft seal device 10 provided in the gas turbine 1 configured as described above will be described with reference to the drawings. FIG. 2 is a diagram as seen from the axial direction Da. As shown in FIG. 2, the shaft seal device 10 includes a plurality of (eight in this embodiment) seal segments 11 extending in an arc shape. The plurality of seal segments 11 are annularly disposed in the circumferential direction Dc. A gap t is formed between the circumferential end portions 12 and 12 of the adjacent seal segments 11 disposed in this manner.

Figure 3:
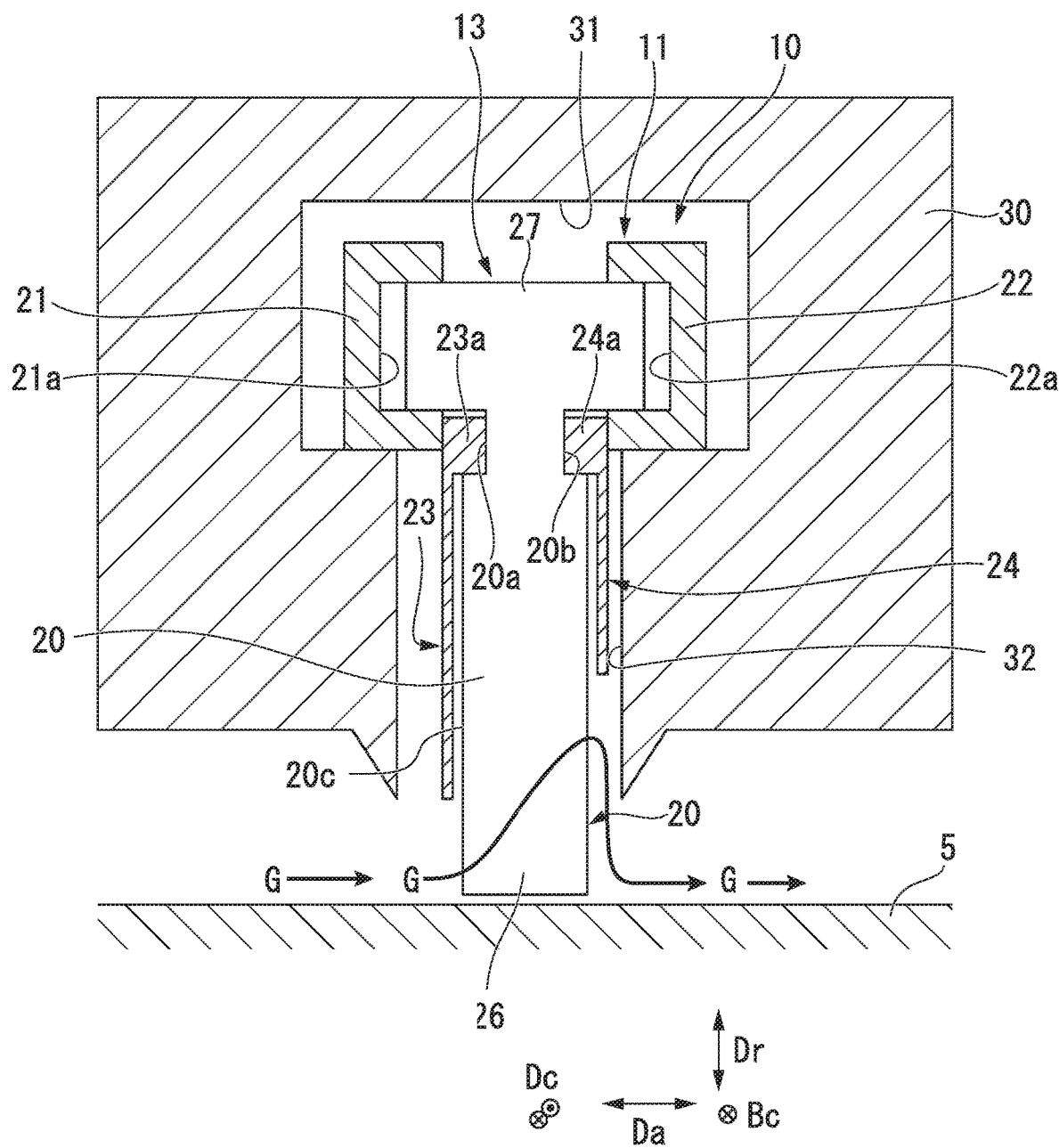
FIG. 3 is a cross-sectional view of a seal segment and a housing in a circumferential direction of according to the first embodiment of the present invention.

The configuration of each seal segment 11 will be described with reference to FIG. 3. A cutting position of the cross-section of the shaft seal device 10 in FIG. 3 corresponds to a position of the line 111-111 shown in the shaft seal device 10 of FIG. 2.

Each seal segment 11 is inserted into a housing (corresponding to the turbine vanes 6, the turbine blades 7 and the bearing portions 8a and 9a) 30 and installed to prevent leakage of a working fluid in the annular space between the rotor 5 and the housing 30.

The seal segment 11 includes a first seal body 13, retainers 21 and 22, a high-pressure side plate 23, and a low-pressure side plate 24.

The first seal body 13 includes a plurality of first thin plate seal pieces 20 which are metallic members laminated in multiple layers at small intervals in the circumferential direction Dc. The plurality of first thin plate seal pieces 20 are laminated in the circumferential direction Dc (rotational direction Bc) in a partial region of the rotor 5 in the circumferential direction Dc, and have an arc band shape as a whole when viewed in the axial direction Da.

The retainers 21 and 22 are configured to clamp the first thin plate seal pieces 20 from both sides at outer circumferential side proximal ends 27 of the first thin plate seal pieces 20. The cross-sections of the retainers 21 and 22 in the circumferential direction Dc are formed in substantially a C shape. Further, the cross-sections of the retainers 21 and 22 in the axial direction Da are formed in a circular arc band shape.

The high-pressure side plate 23 is sandwiched between the edge end on the high-pressure side facing the high-pressure side region of the first thin plate seal piece 20 and the retainer 21. Therefore, the high-pressure side plate 23 extends in the radial direction Dr and the circumferential direction Dc to cover the high-pressure side surface of the plurality of first thin plate seal pieces 20 from the high-pressure side in the axial direction Da.

The low-pressure side plate 24 is sandwiched between the edge end of the low-pressure side facing the low-pressure side region of the first thin plate seal pieces 20 and the retainer 22. Therefore, the low-pressure side plate 24 extends in the radial direction Dr and the circumferential direction Dc to cover the low-pressure side surface of the plurality of first thin plate seal pieces 20 from the low-pressure side in the axial direction Da.

In the first seal body 13 configured as described above, the first thin plate seal pieces 20 are made of thin steel plates having substantially T shapes in which a width (a width in the axial direction Da) on the inner circumferential side is smaller than a width (a width in the axial direction Da) of the outer circumferential side proximal end 27. At both side edges thereof, notched portions 20a and 20b are formed at positions at which the width is small.

A plurality of adjacent first thin plate seal pieces 20 are fixedly connected to each other at the outer circumferential side proximal end 27 by, for example, welding.

The first thin plate seal pieces 20 have a predetermined rigidity based on the plate thickness in the circumferential direction Dc. Further, the first thin plate seal pieces 20 are fixed to the retainers 21 and 22 so that an angle formed between the first thin plate seal pieces 20 and the circumferential surface of the rotor 5 toward the rotational direction Bc is an acute angle.

Therefore, the first thin plate seal pieces 20 extend toward the front side in the rotational direction Bc toward the inner side in the radial direction Dr.

In the seal segment 11 configured as described above, when the rotor 5 is stationary, the leading ends of the respective first thin plate seal pieces 20 come into contact with the rotor 5. When the rotor 5 rotates, due to the dynamic pressure effect generated by the rotation of the rotor 5, the leading ends of the first thin plate seal pieces 20 float from the outer periphery of the rotor 5 and come out of contact with the rotor 5. Therefore, in the seal segment 11, abrasion of each first thin plate seal piece 20 is suppressed, and the life of the seal is prolonged.

The high-pressure side plate 23 has a fitting stepped portion 23a on the outer circumferential side. The width of the fitting stepped portion 23a in the axial direction Da is greater than the width of the high-pressure side plate 23 in the axial direction Da on the inner circumferential side.

The low-pressure side plate 24 has a fitting stepped portion 24a on the outer circumferential side. The width of the fitting stepped portion 24a in the axial direction Da is greater than the width of the low-pressure side plate 24 in the axial direction Da on the inner circumferential side.

The fitting stepped portions 23a and 24a are fitted into the notched portions 20a and 20b of the first thin plate seal pieces 20, respectively.

Further, the retainer 21 has a recessed groove 21a on the surface facing one side edge (the end edge on the high-pressure side) of the outer circumferential side proximal end 27 of the plurality of first thin plate seal pieces 20. The retainer 22 has a recessed groove 22a on the surface facing the other side edge (the side edge on the low-pressure side) of the outer circumferential side proximal end 27 of the plurality of first thin plate seal pieces 20. The fitting stepped portion 23a of the high-pressure side plate 23 and the fitting stepped portion 24a of the low-pressure side plate 24 are fitted into the notched portions 20a and 20b, respectively. One side edge (the side edge on the high-pressure side) on the outer circumferential side of the plurality of first thin plate seal pieces 20 fitted with the fitting stepped portion 23a and the fitting stepped portion 24a is fitted into the recessed groove 21a of the retainer 21. Further, the other side edge (the side edge on the low-pressure side) on the outer circumferential side thereof is fitted into the recessed groove 22a of the retainer 22. With such a configuration, the respective first thin plate seal pieces 20 are fixed to the retainers 21 and 22.

An annular recessed groove 31 is formed on the inner circumferential wall surface of the housing 30. The annular recessed groove 31 has a shape in which a stepped portion is provided on the side surface facing one side edge (side edge on the high-pressure side) of the first thin plate seal pieces 20 and the other side edge (the side edge on the low-pressure side) such that the width on the outer circumferential side is greater than the width on the inner circumferential side in the axial direction of the rotor 5. Further, the first thin plate seal pieces 20, the retainers 21 and 22, the high-pressure side plate 23 and the low-pressure side plate 24 are fitted into the recessed groove 31 of the housing 30 such that the surface facing the inner circumferential side of the retainers 21 and 22 is brought into contact with the surface facing the outer circumferential side in the step. The inner circumferential side end portions 26 of the first thin plate seal pieces 20 protrude toward the rotor 5 side from the high-pressure side plate 23. On the other hand, the inner circumferential side end portions 26 of the first thin plate seal pieces 20 protrude toward the rotor 5 side from the low-pressure side plate 24, but the protruding amount thereof is set to be greater than that of the high-pressure side end portion. That is, the first thin plate seal pieces 20 are more greatly exposed to the working fluid G on the low-pressure side than on the high-pressure side. In other words, the high-pressure side plate 23 shields a wider range on the side surface of the first thin plate seal pieces 20 from the working fluid G.

The high-pressure side plate 23 is brought into close contact with the side surfaces 20c of the first thin plate seal pieces 20 by the pressure caused by the flow of the working fluid G, thereby preventing the working fluid G from greatly flowing into the gaps between the plurality of first thin plate seal pieces 20. Therefore, the high-pressure side plate 23 creates an upward flow from the inner circumferential side end portion 26 toward the outer circumferential side proximal end 27 in the gap portion between the plurality of first thin plate seal pieces 20, thereby causing the inner circumferential side end portion 26 of the first thin plate seal pieces 20 to float by the fluid force and come out of contact.

Further, the low-pressure side plate 24 is pushed by the high-pressure side plate 23 and the first thin plate seal pieces 20 to come into close contact with the low-pressure side wall surface 32 of the inner circumferential wall surface of the housing 30. Since the inner diameter of the low-pressure side plate 24 is larger than that of the high-pressure side plate 23, the flow in the gaps between the plurality of first thin plate seal pieces 20 has flowing conditions that make floating easy.

Figure 4:
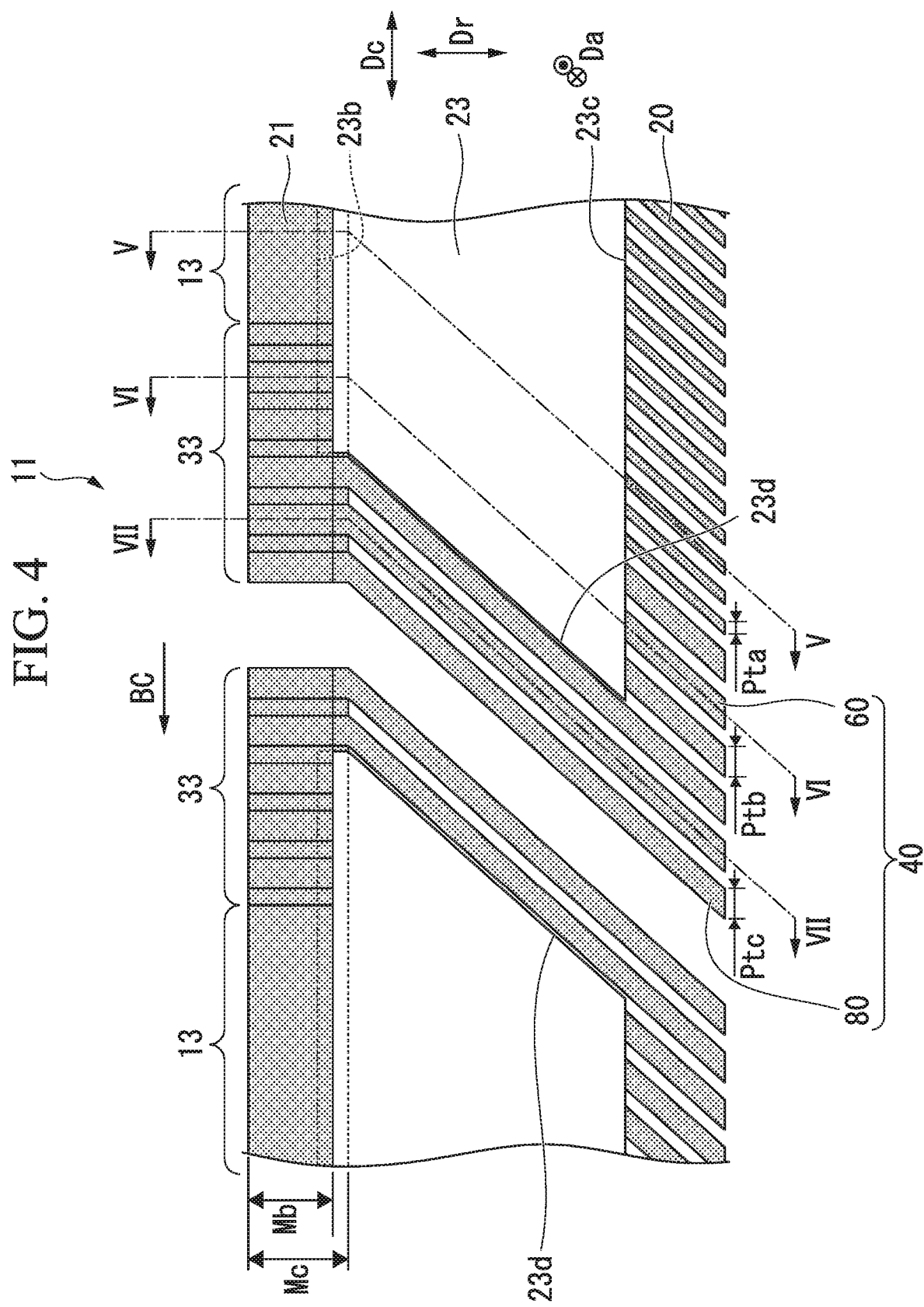
FIG. 4 is a side view of a main part of the seal segment according to the first embodiment of the present invention as seen from an axial direction.

As shown in FIG. 4, the seal segment 11 of the present embodiment further includes a second seal body 33 on both end sides of the first seal body 13 in the circumferential direction Dc.

The structure of the second seal body 33 and its surroundings will be described with reference to FIGS. 4 to 8.

The second seal body 33 has a plurality of second thin plate seal pieces 40.

The plurality of second thin plate seal pieces 40 include a plurality of second main thin plate seal pieces 60 disposed next to the plurality of first thin plate seal pieces 20 in the circumferential direction Dc, and a plurality of second auxiliary thin plate seal pieces 80 are disposed next to the plurality of second main thin plate seal pieces 60 in the circumferential direction Dc.

The plurality of second main thin plate seal pieces 60 and the plurality of second auxiliary thin plate seal pieces 80 are laminated in the circumferential direction Dc at the end portions of the retainers 21 and 22 in the circumferential direction Dc.

The laminated second main thin plate seal pieces 60 and the respective second auxiliary thin plate seal pieces 80 extend inward in the radial direction Dr.

A plurality of second main thin plate seal pieces 60 are metallic members and are laminated in multiple layers at small intervals in the circumferential direction Dc.

A plurality of second auxiliary thin plate seal pieces 80 are metallic members and are laminated in multiple layers at small intervals in the circumferential direction Dc.

As shown in FIG. 4, the high-pressure side plate 23 further extends in the circumferential direction Dc to cover the high-pressure side surface of the plurality of first thin plate seal pieces 20 and to cover the high-pressure side surface of the plurality of second main thin plate seal pieces 60 from the high-pressure side in the axial direction Da.

Similarly, the low-pressure side plate 24 not shown in FIG. 4 also further extends in the circumferential direction Dc to cover the low-pressure side surface of the plurality of first thin plate seal pieces 20 as described above and to cover the low-pressure side surface of the second main thin plate seal piece 60 from the low-pressure side in the axial direction Da.

Therefore, the high-pressure side plate 23 and the low-pressure side plate 24 cover the axial side surface of the first seal body 13 over the circumferential direction Dc and cover at least a part of the circumferential direction Dc of the axial side surface of the second seal body 33.

Therefore, the second main thin plate seal pieces 60 have a structure which is fitted between the high-pressure side plate 23 and the low-pressure side plate 24, and similarly to the first thin plate seal pieces 20, the second main thin plate seal pieces 60 are disposed between the high-pressure side plate 23 and the low-pressure side plate 24 facing each other in the axial direction Da.

The high-pressure side plate 23 has, as an edge portion in the circumferential direction Dc, a circumferential edge portion 23d which extends forward in the rotational direction Bc from the outer diameter side edge portion 23b toward the inside in the radial direction Dr and is connected to the inner diameter side edge portion 23c.

In the present embodiment, the high-pressure side plate 23 extends to a boundary between the high-pressure side surface of the second main thin plate seal pieces 60 and the high-pressure side surface of the second auxiliary thin plate seal pieces 80 in the circumferential direction Dc, and the circumferential edge portion 23d is located at the boundary.

Like the high-pressure side plate 23, the low-pressure side plate 24 also has, as an edge portion in the circumferential direction Dc, a front side edge portion which extends forward in the rotational direction Bc from the outer diameter side edge portion to the inside in the radial direction Dr, and connected to the inner diameter side edge portion. Further, similarly to the high-pressure side plate 23, the low-pressure side plate 24 extends to the boundary between the low-pressure side surface of the second main thin plate seal pieces 60 and the low-pressure side surface of the second auxiliary thin plate seal pieces 80 in the circumferential direction Dc, and the front side edge portion is located at the relevant boundary.

Accordingly, the second auxiliary thin plate seal pieces 80 are not fitted between the high-pressure side plate 23 and the low-pressure side plate 24 but are exposed in the circumferential direction Dc from the high-pressure side plate 23 and the low-pressure side plate 24 when viewed from the side surface in the axial direction Da.

The plurality of second auxiliary thin plate seal pieces 80 are adjusted in number in accordance with the gap of the divided portion between the respective the seal segments 11 to shield the gap of the divided portion between the respective seal segments 11.

Since the plurality of second auxiliary thin plate seal pieces 80 are exposed in the circumferential direction Dc from the high-pressure side plate 23 and the low-pressure side plate 24, some of the second auxiliary thin plate seal pieces 80 can be sequentially peeled off. Accordingly, the plurality of second auxiliary thin plate seal pieces 80 have a structure in which the number of necessary thin plate seal pieces can be easily adjusted in accordance with the gap of the divided portion between the respective seal segments 11.

The plate thickness Pta of the first thin plate seal pieces 20 has a constant size over all of the plurality of first thin plate seal pieces 20 arranged in the circumferential direction Dc.

On the other hand, as shown in FIG. 4, the plate thickness Ptb of the second main thin plate seal pieces 60 has a constant size over all of the plurality of second main thin plate seal pieces 60, and is greater than the plate thickness Pta of the first thin plate seal pieces 20. The plate thickness Ptc of the second auxiliary thin plate seal pieces 80 also has a constant size over all of the plurality of second auxiliary thin plate seal pieces 80 and is greater than the plate thickness Pta of the first thin plate seal pieces 20. In the present embodiment, the plate thickness Ptb and the plate thickness Ptc are set to be the same, but they may be different from each other.

Figure 5:
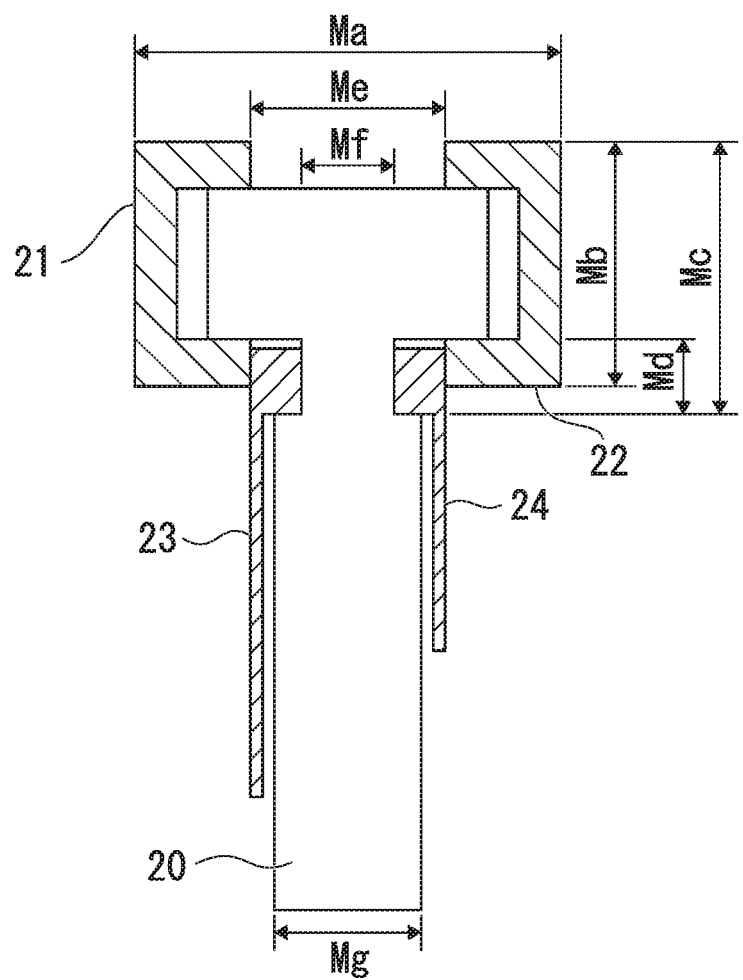
FIG. 5 is a cross-sectional view taken along the line V-V in FIG. 4.
Figure 6:
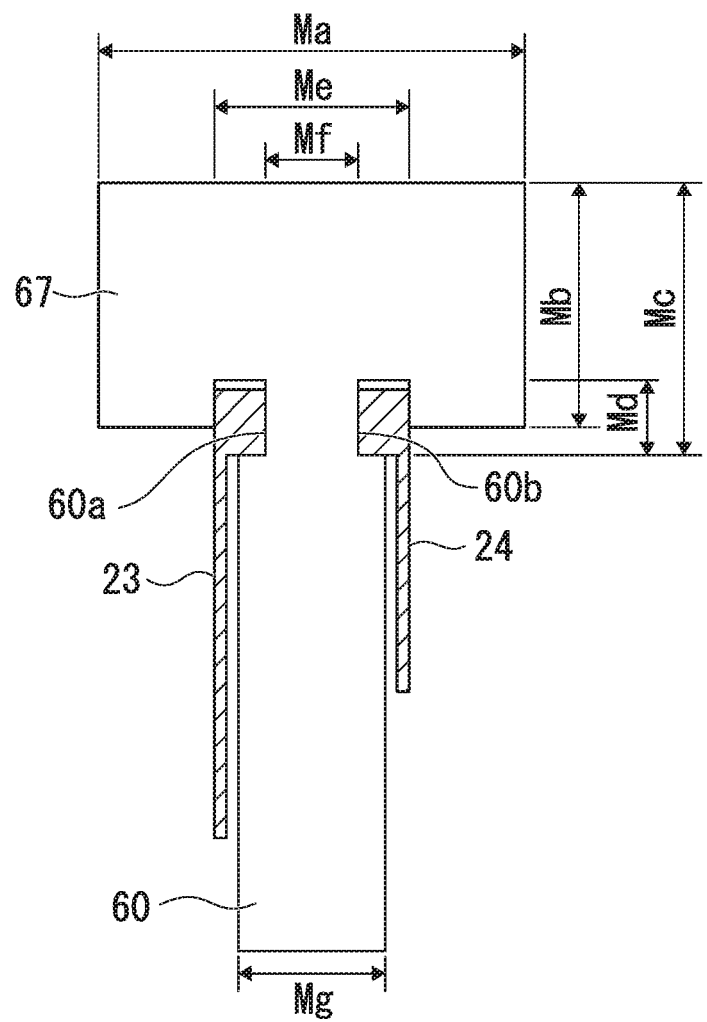
FIG. 6 is a cross-sectional view taken along the line VI-VI in FIG. 4.
Figure 7:
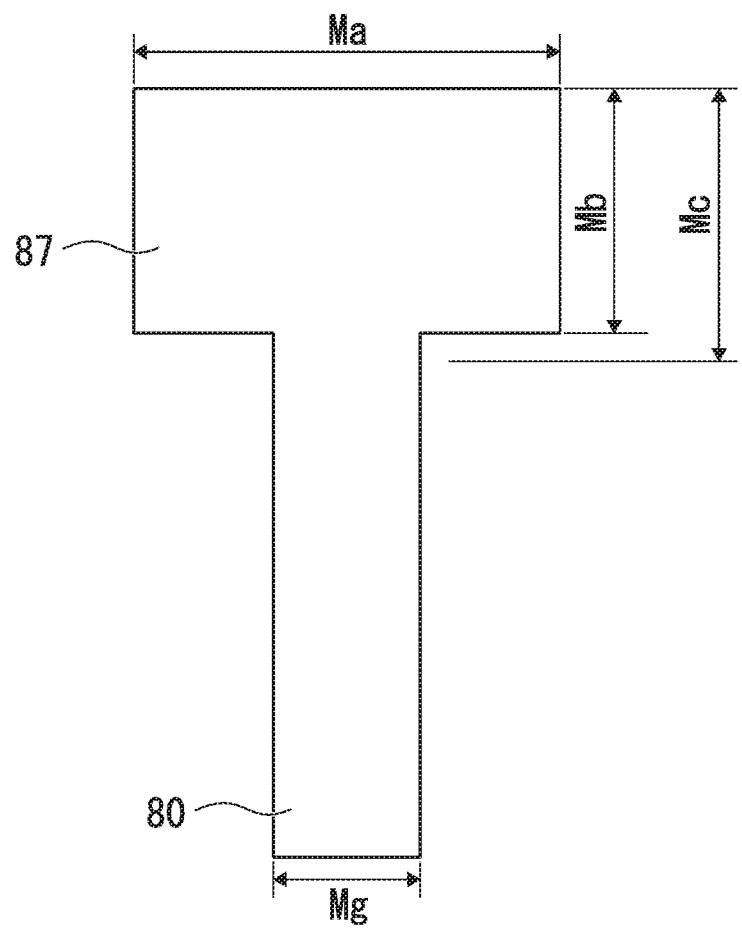
FIG. 7 is a cross-sectional view taken along the line VII-VII in FIG. 4.

As shown in FIGS. 5 to 7, in the case of the present embodiment, an approximate shape of an outline of the combination of the first thin plate seal pieces 20, the retainer 21 and the retainer 22 in the cross-section of the circumferential direction Dc, an approximate shape of an outline of the second main thin plate seal pieces 60, and a shape of an outline of the second auxiliary thin plate seal pieces 80 are the same in size and shape.

On the other hand, the combination of the first thin plate seal pieces 20, the retainer 21 and the retainer 22 in the cross-section of the circumferential direction Dc, the plurality of second main thin plate seal pieces 60, and the plurality of second auxiliary thin plate seal pieces 80 are arranged such that the respective shapes in the cross-section of the circumferential direction Dc are aligned in the circumferential direction Dc.

Therefore, since the side surface of the seal segment 11 in the axial direction Da is substantially flush with the first seal body 13 and the second seal body 33, the seal segment 11 has a structure that does not greatly hinder the flow of the working fluid G, thereby suppressing the occurrence of uneven flow. If occurrence of uneven flow is suppressed, it is possible to suppress degradation of sealing property or occurrence of fluttering.

In FIGS. 5 to 7, portions indicated by the same symbols (Ma to Mg) for each structure indicate the same size.

Further, when the uneven flow is not a problem, it is not necessary to make the dimensions and the shape in the cross-section in the circumferential direction Dc the same, and it is not necessary to make the side surface in the axial direction Da flush.

The plurality of second thin plate seal pieces 40 are not clamped by the retainers 21 and 22, but are joined to each other by welding or brazing at the outer circumferential side proximal end 67 and the outer circumferential side proximal end 87. Therefore, the second seal body 33 is configured to be removable from the retainer 21, the retainer 22, and the first seal body 13, and is also formed into a block.

As a modified example, the plurality of second thin plate seal pieces 40 may be blocked and fixed to each other at the outer circumferential side proximal end 67 and the outer circumferential side proximal end 87 by screwing, strapping or the like.

Figure 8:
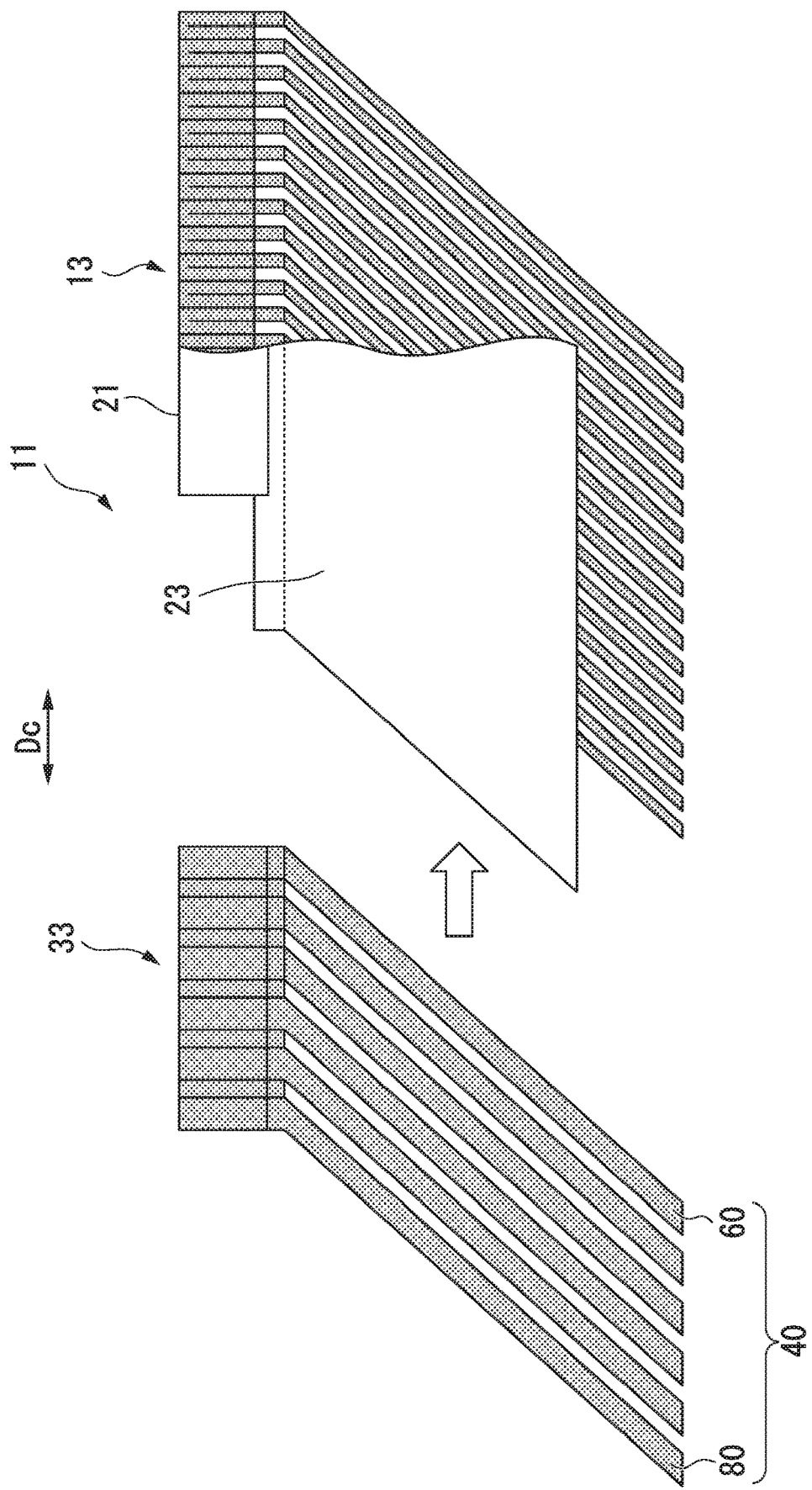
FIG. 8 is a diagram showing a second seal body according to the first embodiment of the present invention.

As shown in FIG. 8, the blocked second seal body 33 is fitted between the high-pressure side plate 23 and the low-pressure side plate 24 toward the end portions of the retainers 21 and 22 n the circumferential direction Dc. Therefore, the second seal body 33 is fitted on the end surface of the first seal body 13 in the circumferential direction Dc like a cap to protect the first thin plate seal pieces 20.

As shown in FIG. 6, in the plurality of second main thin plate seal pieces 60, a notched portion 60a into which the fitting stepped portion 23a of the high-pressure side plate 23 is fitted, and a notched portion 60b into which the fitting stepped portions 24a of the low-pressure side plate 24 is fitted are provided. Therefore, as the notched portions 60a and 60b are fitted to the fitting stepped portions 23a and 24a, respectively, the blocked second seal body 33 is able to slide in the circumferential direction Dc while being restricted in the radial direction Dr when fitted between the high-pressure side plate 23 and the low-pressure side plate 24.

The operation and effect of the second seal body 33 will be described.

Since the seal segment 11 of the present embodiment has a plurality of second thin plate seal pieces 40 having plate thicknesses Ptb and Ptc larger than the plate thickness Pta of the first thin plate seal pieces 20, on the end surface of the first seal body 13 in the circumferential direction Dc, the rigidity of the thin plate seal pieces at the end portion of the seal segment 11 in the circumferential direction Dc is enhanced. Therefore, abrasion of the thin plate seal pieces at the divided portion between the seal segments 11, that is, at the divided portion between the high-pressure side plates 23 of the seal segments 11 adjacent to each other in the circumferential direction Dc, is suppressed.

On the other hand, thin plate seal pieces having a thin plate thickness are used on the inner side in the circumferential direction Dc from the end portion of the seal segment 11, and the performance of the floating property of the thin plate seal pieces is maintained.

Further, the second seal body 33 having thin plate seal pieces with high rigidity is fitted on the end surface of the first seal body 13 in the circumferential direction Dc like a cap to protect the first thin plate seal pieces 20.

Furthermore, in the seal segment 11 of the present embodiment, the plate thickness Ptc of the second auxiliary thin plate seal pieces 80 not covered with the high-pressure side plate 23, and the plate thickness Ptb of the second main thin plate seal pieces 60 covered with the high-pressure side plate 23 near the circumferential edge portion 23d are greater than the plate thickness Pta of the first thin plate seal pieces 20. That is, by enhancing the rigidity of the second main thin plate seal pieces 60 and the second auxiliary thin plate seal pieces 80, the following operations and effects are obtained.

The circumferential edge portion 23d of the high-pressure side plate 23 does not easily come in close contact with the side surface of the thin plate seal piece, and the working fluid G flows to the inner side of the high-pressure side plate 23 in the axial direction Da.

When the first thin plate seal pieces 20 are arranged over the circumferential edge portion 23d of the high-pressure side plate 23 without using the second seal body 33, since the working fluid G flows to the inner side of the high-pressure side plate 23 in the axial direction Da, the flow of the working fluid G in the axial direction Da also leaks into the first thin plate seal pieces 20 covered with the high-pressure side plate 23. Therefore, there is a possibility that fluttering occurs not only in the first thin plate seal pieces 20 not covered with the high-pressure side plate 23, but also the first thin plate seal pieces 20 covered with the high-pressure side plate 23 near the circumferential edge portion 23d.

On the other hand, as described above, the seal segment 11 of the present embodiment enhances not only the rigidity of the second auxiliary thin plate seal pieces 80 not covered with the high-pressure side plate 23, but also the rigidity of the second main thin plate seal pieces 60 covered with the high-pressure side plate 23 near the circumferential edge portion 23d.

Therefore, fluttering is also suppressed in the second main thin plate seal pieces 60 covered with the high-pressure side plate 23 near the circumferential edge portion 23d.

In addition, in the seal segment 11 of this embodiment, the blocked second seal body 33 of the small portion can be fitted into the majority of the first seal body 13 manufactured by the normal manufacturing process. That is, it is possible to provide a small number of thin plate seal pieces having different plate thicknesses only at the end portion in the circumferential direction Dc after manufacturing most of the seal segments 11 with a large number of thin plate seal pieces having the same plate thickness.

Therefore, since it is possible to change the plate pressure only in the vicinity of the divided portion of the seal segment 11 while maintaining the manufacturing process of assembling the thin plate seal pieces of the same plate thickness (which is a normal manufacturing process), it is possible to promote the maintenance of the quality and improvement in the production efficiency.

Second Embodiment

Figure 9:
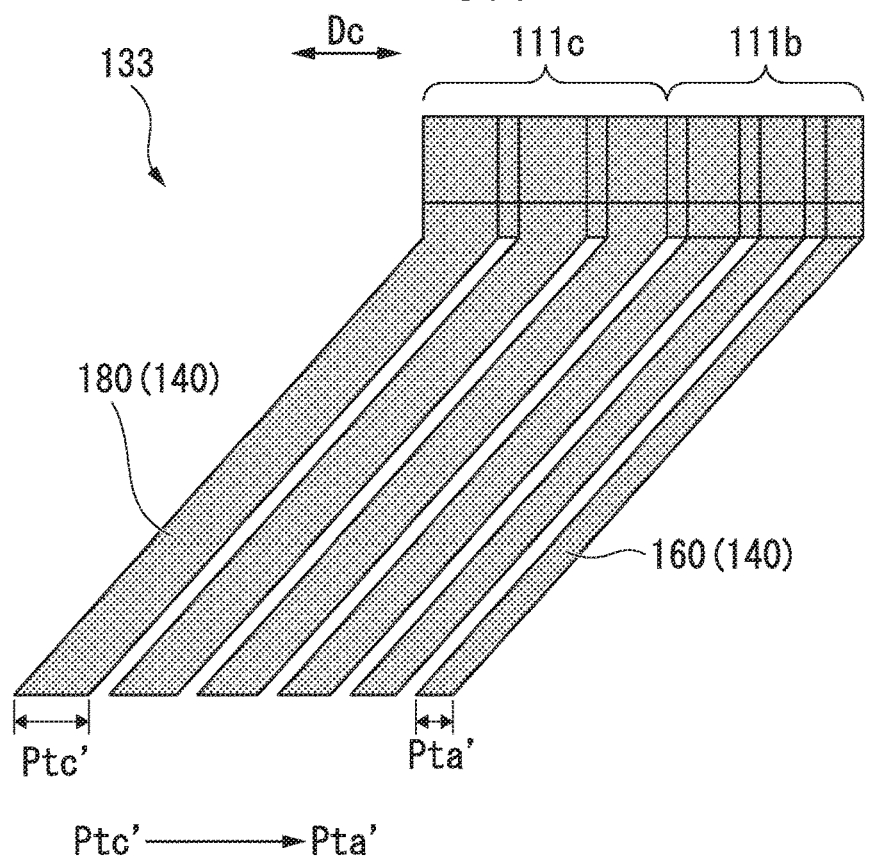
FIG. 9 is a side view of the second seal body according to a second embodiment of the present invention.

Hereinafter, a second embodiment of the present invention will be described with reference to FIG. 9.

The seal segment of this embodiment is basically the same as the first embodiment, but a structure of the second seal body is different.

The seal segment of the present embodiment further includes a second seal body 133 on both end sides of the first seal body 13 in the circumferential direction Dc. FIG. 9 shows only the second seal body 133 of the present embodiment.

The second seal body 133 of the present embodiment has a plurality of second thin plate seal pieces 140.

The plurality of second thin plate seal pieces 140 includes a plurality of second main thin plate seal pieces 160 disposed next to the circumferential direction Dc of the plurality of first thin plate seal pieces 20, and a plurality of second thin plate seal pieces 180 disposed next to the plurality of second main thin plate seal pieces 160 in the circumferential direction Dc.

Similarly to the second seal body 33, the second seal body 133 has a configuration which is detachable from the retainer 21, the retainer 22, and the first seal body 13, and is also formed into a block.

The plate thickness of each second thin plate seal piece 140 is larger than the plate thickness Pta of the first thin plate seal piece 20. Further, as shown in FIG. 9, the plurality of second thin plate seal pieces 140 are not constant in plate thickness, but is configured to decrease from a plate thickness Ptc' to a plate thickness Pta' toward the first thin plate seal piece 20 in the circumferential direction Dc and become closer to the plate thickness Pta.

Therefore, the plate thickness of the thin plate seal piece gradually changes to become a plate thickness suitable for giving the floating characteristic to the thin plate seal piece as it goes away from the divided portion of the seal segment in the circumferential direction Dc.

The operation and effect of the second seal body 133 will be described.

Like the second seal body 33, the second seal body 133 also has high rigidity of the second main thin plate seal piece 160 and the second auxiliary thin plate seal piece 180. Therefore, abrasion of the thin plate seal piece of the divided portion of the seal segment is suppressed, and fluttering abrasion is also suppressed on the second main thin plate seal piece 160 covered with the high-pressure side plate 23 bear the circumferential edge portion 23d.

Furthermore, the second seal body 133 has the following operations and effects. The flow of the working fluid G flowing from the divided portion of the seal segment to the inner side of the high-pressure side plate 23 in the axial direction Da decreases as it goes away from the divided portion of the seal segment. That is, as it goes away from the divided portion of the seal segment increases, the pressure balance of the working fluid G in the gap portion between the plurality of thin plate seal pieces approaches an ideal pressure balance suitable for the performance of the floating characteristics. Therefore, since the possibility of occurrence of fluttering of the thin plate seal piece gradually decreases as it goes away from the divided portion of the seal segment, it is not necessary to increase the plate thickness of the thin plate seal piece.

On the other hand, as the second seal body 133 moves away from the divided portion of the seal segment, the plate thickness of the thin plate seal piece gradually decreases.

Therefore, the second thin plate seal piece 140 of the divided portion of the seal segment, which cannot avoid abrasion due to fluttering, of the second thin plate seal piece 140 has a large plate thickness and a large rigidity. On the other hand, as it goes away from the divided portion of the seal segment, the plate thickness decreases, and the rigidity of the second thin plate seal piece 140 also decreases. Therefore, the second thin plate seal piece 140 has the floating characteristic. Further, by gradually changing the plate thickness of the second thin plate seal piece 140, uneven flow can be suppressed.

The plurality of second thin plate seal pieces 140 of the present embodiment are configured so that the plate thickness continuously decreases from a plate thickness Ptc' to a plate thickness Pta' in the circumferential direction Dc and approaches the plate thickness Pta. As a modified example, the plate thickness Ptc' of each second auxiliary thin plate seal piece 180 is constant, and only the plate thickness of each second main thin plate seal piece 160 may be configured to continuously decrease from the plate thickness Ptc' to the plate thickness Pta' and approach the plate thickness Pta.

Third Embodiment

Hereinafter, a third embodiment of the present invention will be described with reference to FIG. 10.

A seal segment of the present embodiment is basically the same as that of the first embodiment, but the structure of a third seal body is different.

In the seal segment of the present embodiment, a second seal body 233 is further included on both end sides of the first seal body 13 in the circumferential direction Dc.

Figure 10:
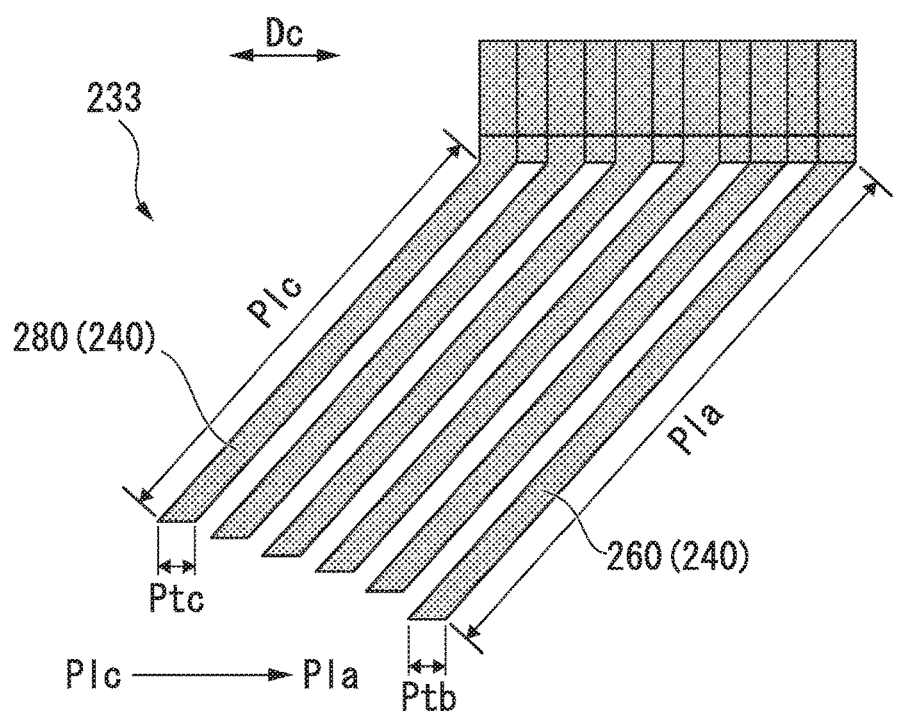
FIG. 10 is a side view of the second seal body according to a third embodiment of the present invention.

FIG. 10 shows only the second seal body 233 of the present embodiment.

The second seal body 233 of the present embodiment has a plurality of second thin plate seal pieces 240.

The plurality of second thin plate seal pieces 240 include a plurality of second main thin plate seal pieces 260 disposed next to the circumferential direction Dc of the plurality of first thin plate seal pieces 20, and a plurality second minor thin plate seal piece 280 disposed next to the plurality of second main thin plate seal pieces 260 in the circumferential direction Dc.

Similarly to the second seal body 33, the second seal body 233 is configured to be detachable from the retainer 21, the retainer 22 and the first seal body 13, and is also formed into a block.

Hereinafter, the length of each thin plate seal piece extending inward in the radial direction Dr is simply referred to as "length of the thin plate seal piece".

The plate thickness Pta of the first thin plate seal piece 20 has a constant size over the whole of the plurality of first thin plate seal pieces 20 arranged in the circumferential direction Dc.

On the other hand, as shown in FIG. 10, the plate thickness Ptb of each second main thin plate seal piece 260 has a constant size over the whole of the plurality of second main thin plate seal pieces 260, and is greater than the plate thickness Pta of the first thin plate seal piece 20. The plate thickness Ptc of each second auxiliary thin plate seal piece 280 also has a constant size over the whole of the plurality of second auxiliary thin plate seal pieces 280, and is greater than the plate thickness Pta of the first thin plate seal piece 20. In the present embodiment, the plate thickness Ptb and the plate thickness Ptc are set to be the same, but they may be different from each other.

Further, as shown in FIG. 10, the lengths of the plurality of second thin plate seal pieces 240 in the circumferential direction Dc are not constant, the length continuously increases from the length Plc to the length Pla toward the first thin plate seal piece 20, and the second main thin plate seal piece 260 adjacent to the first thin plate seal piece 20 has a length Pla. In the present embodiment, the length Pla is set to be smaller than the length of the first thin plate seal piece 20, but the length Pla may be the same as the length of the first thin plate seal piece 20.

That is, in the divided portion of the seal segment, the length of the thin plate seal piece is made small, and the length of the thin plate seal piece is gradually increased as it goes away from the divided portion of the seal segment in the circumferential direction Dc.

Therefore, with regard to the second thin plate seal piece 240 of the divided portion of the seal segment of the second thin plate seal piece 240, in which abrasion due to fluttering cannot be avoided, the length of the thin plate seal piece is set to be small to increase fluttering resistance. On the other hand, the length of the thin plate seal piece is increased as it goes away from the divided portion of the seal segment is increased, and the floating characteristics are imparted to the second thin plate seal piece 240. Further, by gradually changing the length of the second thin plate seal piece 240, uneven flow can be suppressed.

The plurality of second thin plate seal pieces 240 of the present embodiment are configured to continuously increase in the circumferential direction Dc from the length Plc toward the length Pla. As a modified example, a configuration in which the length Plc of each second auxiliary thin plate seal piece 280 is set to be constant, and only the length of each second main thin plate seal piece 260 is continuously increased from the length Plc toward the length Pla may be adopted.

Although the embodiments of the present invention have been described in detail with reference to the drawings, specific configurations are not limited to the above embodiments, and design changes and the like within the scope not departing from the gist of the present invention are included.

Although the number of the seal segments 11 provided in the shaft seal device 10 of the present embodiment is eight, the number is not limited thereto and may be any one of two to seven, or even nine or more.

In each embodiment, the thickness of the thin plate seal piece is changed between the first thin plate seal piece and the second thin plate seal piece. That is, the structure of the thin plate seal piece is changed so that the rigidity of the second thin plate seal piece become greater than the rigidity of the first thin plate seal piece. As a modified example, the rigidity of the second thin plate seal piece may be made greater than the rigidity of the first thin plate seal piece, using a material having rigidity higher than the material of the first thin plate seal piece as the second thin plate seal piece. Furthermore, as long as the rigidity of the thin plate seal piece can be changed, the rigidity of the thin plate seal piece may be changed by selecting and adjusting the combination of the structure and the material of the thin plate seal piece.

Each of the embodiments and modified examples is configured such that the fluttering resistance is increased by changing the thickness, the length or the material of the second thin plate seal piece. However, the thicknesses, the lengths and the materials of various second thin plate seal pieces may be selected or combined to increase the fluttering resistance.

In each of the embodiments, the second auxiliary thin plate seal pieces are provided. However, when it is not necessary to shield the gap of the divided portion between the respective seal segments 11, the second auxiliary thin plate seal piece may not be provided.

INDUSTRIAL APPLICABILITY

The seal segment of the present invention can suppress performance deterioration of floating characteristics of the thin plate seal piece or fluttering generated in the thin plate seal piece.

REFERENCE SIGNS LIST

1 Gas turbine
2 Compressor
3 Combustor
4 Turbine
5 Rotor
6 Turbine vane
7 Turbine blade
8 Casing
8a Bearing portion
9 Casing
9a Bearing portion
10 Shaft seal device
11 Seal segment
12 Circumferential end portion
13 First seal body
20 First thin plate seal piece
20a Notched portion
20b Notched portion
20c Side surface
21 Retainer
21a Groove
22 Retainer
22a Groove
23 High-pressure side plate
23a Fitting stepped portion
23b Outer diameter side edge portion
23c Inner diameter side edge portion
23d Circumferential edge portion
24 Low-pressure side plate
24a Fitting stepped portion
26 Inner circumferential side end portion
27 Outer circumferential side proximal end
30 Housing
31 Recessed groove
32 Low-pressure side wall surface
33 Second seal body
40 Second thin plate seal piece
60 Second main thin plate seal piece
60a Notched portion
60b Notched portion
67 Outer circumferential side proximal end
80 Second auxiliary thin plate seal piece
87 Outer circumferential side proximal end
133 Second seal body
140 Second thin plate seal piece
160 Second main thin plate seal piece
180 Second auxiliary thin plate seal piece
233 Second seal body
240 Second thin plate seal piece
260 Second main thin plate seal piece
280 Second auxiliary thin plate seal piece
Ax Axis
Bc Rotational direction
Da Axial direction
Dc Circumferential direction
Dr Radial direction
G Working fluid

What is claimed is:

1. A seal segment comprising:
a first retainer and a second retainer that extend in a circumferential direction of a rotary shaft on an outer circumferential side of the rotary shaft;
a first seal body which has a plurality of first thin plate seal pieces extending inward in a radial direction from the first retainer and the second retainer, the first thin plate seal pieces being laminated in the circumferential direction;
a high-pressure side plate which is supported to be sandwiched between the first seal body and the first retainer, and covers a high-pressure side in an axial direction of the first seal body over the circumferential direction;

a low-pressure side plate which is supported to be sandwiched between the first seal body and the second retainer, and covers a low-pressure side in the axial direction of the first seal body over the circumferential direction; and a second seal body having a plurality of second thin plate seal pieces which are laminated at an end portion of the first retainer and the second retainer in the circumferential direction, extend inward in the radial direction, and have higher fluttering resistance than the first thin plate seal pieces, wherein the high-pressure side plate and the low-pressure side plate cover at least a part of the second seal body in the circumferential direction, wherein the second seal body is configured to be detachable from the first retainer, the second retainer and the first seal body, and wherein the second seal body is formed into a block.

2. The seal segment according to claim 1, wherein the second thin plate seal pieces have greater rigidity than the first thin plate seal pieces.

3. The seal segment according to claim 1, wherein the second thin plate seal pieces have a thicker plate thickness than the first thin plate seal pieces.

4. The seal segment according to claim 1, wherein the number of the second thin plate seal pieces is plural, and the plate thickness decreases toward the first thin plate seal pieces.

5. The seal segment according to claim 1, wherein the second thin plate seal pieces have a smaller length extending inward in the radial direction than the first thin plate seal pieces.

6. The seal segment according to claim 1, wherein the number of the second thin plate seal pieces is plural, and the length extending inward in the radial direction increases toward the first thin plate seal pieces.

7. A rotary machine comprising the seal segment according to claim 1.

8. The seal segment according to claim 1, wherein the second thin plate seal pieces include:

second main thin plate seal pieces covered with the high-pressure side plate and the low-pressure side plate in the circumferential direction; and second auxiliary thin plate seal pieces exposed from the high-pressure side plate and the low-pressure side plate in the circumferential direction.

9. A seal segment comprising:

a first retainer and a second retainer that extend in a circumferential direction of a rotary shaft on an outer circumferential side of the rotary shaft;

a first seal body which has a plurality of first thin plate seal pieces extending inward in a radial direction from the first retainer and the second retainer, the first thin plate seal pieces being laminated in the circumferential direction;

a high-pressure side plate which is supported to be sandwiched between the first seal body and the first retainer, and covers a high-pressure side in an axial direction of the first seal body over the circumferential direction;

a low-pressure side plate which is supported to be sandwiched between the first seal body and the second retainer, and covers a low-pressure side in the axial direction of the first seal body over the circumferential direction; and a second seal body having a plurality of second thin plate seal pieces which are laminated at an end portion of the first retainer and the second retainer in the circumferential direction, extend inward in the radial direction, and have higher fluttering resistance than the first thin plate seal pieces, wherein the high-pressure side plate and the low-pressure side plate cover at least a part of the second seal body in the circumferential direction, and wherein the second thin plate seal pieces have greater rigidity than the first thin plate seal pieces.

10. A seal segment comprising:

a first retainer and a second retainer that extend in a circumferential direction of a rotary shaft on an outer circumferential side of the rotary shaft;

a first seal body which has a plurality of first thin plate seal pieces extending inward in a radial direction from the first retainer and the second retainer, the first thin plate seal pieces being laminated in the circumferential direction;

a high-pressure side plate which is supported to be sandwiched between the first seal body and the first retainer, and covers a high-pressure side in an axial direction of the first seal body over the circumferential direction;

a low-pressure side plate which is supported to be sandwiched between the first seal body and the second retainer, and covers a low-pressure side in the axial direction of the first seal body over the circumferential direction; and a second seal body having a plurality of second thin plate seal pieces which are laminated at an end portion of the first retainer and the second retainer in the circumferential direction, extend inward in the radial direction, and have higher fluttering resistance than the first thin plate seal pieces, wherein the high-pressure side plate and the low-pressure side plate cover at least a part of the second seal body in the circumferential direction, and wherein the second thin plate seal pieces have a thicker plate thickness than the first thin plate seal pieces.

* * * * *